(12) United States Patent
Mandal

(10) Patent No.: US 9,354,342 B2
(45) Date of Patent: May 31, 2016

(54) ACOUSTIC SIGNAL PROCESSING USING MODEL-BASED ADAPTIVE FILTERING

(75) Inventor: Batakrishna Mandal, Missouri City, TX (US)

(73) Assignee: Halliburton Energy Services, Inc., Houston, TX (US)

(*) Notice: Subject to any disclaimer, the term of this patent is extended or adjusted under 35 U.S.C. 154(b) by 98 days.

(21) Appl. No.: 14/004,242

(22) PCT Filed: Mar. 15, 2011

(86) PCT No.: PCT/US2011/028516
§ 371 (c)(1),
(2), (4) Date: Sep. 10, 2013

(87) PCT Pub. No.: WO2012/125161
PCT Pub. Date: Sep. 20, 2012

(65) Prior Publication Data
US 2014/0005946 A1  Jan. 2, 2014

(51) Int. Cl.
*G01V 1/36* (2006.01)
*G01V 1/48* (2006.01)

(52) U.S. Cl.
CPC *G01V 1/364* (2013.01); *G01V 1/48* (2013.01); *G01V 2210/21* (2013.01); *G01V 2210/622* (2013.01)

(58) Field of Classification Search
CPC ..... G01V 1/48; G01V 1/364; G01V 2210/21; G01V 2210/622
USPC .......................................................... 702/17
See application file for complete search history.

(56) References Cited

U.S. PATENT DOCUMENTS

| 5,587,966 | A  | * | 12/1996 | Kimball et al. | 367/31 |
|---|---|---|---|---|---|
| 6,192,316 | B1 | * | 2/2001 | Hornby | G01V 1/50 367/38 |
| 6,510,104 | B1 | * | 1/2003 | Ikegami | 367/31 |
| 7,660,196 | B2 | * | 2/2010 | Saiki et al. | 367/31 |
| 2002/0093879 | A1 | * | 7/2002 | Mandal | 367/27 |
| 2004/0122595 | A1 |  | 6/2004 | Valero |  |
| 2009/0168595 | A1 |  | 7/2009 | Wu et al. |  |
| 2010/0284247 | A1 | * | 11/2010 | Manning et al. | 367/28 |

FOREIGN PATENT DOCUMENTS

| WO | 2005/116693 A1 | 12/2005 |
|---|---|---|
| WO | 2010/040087 A2 | 4/2010 |

OTHER PUBLICATIONS

International Preliminary Report on Patentability issued in related PCT Application No. PCT/US2011/028516 mailed Aug. 1, 2013, 6 pages.
Kimball, C.V., "Shear slowness measurement by dispersive processing of the borehole flexural mode", Geophysics, Society of Exploration Geophysicists, US, vol. 63, No. 2, 1 Mar. 1998, pp. 337-344.
International Search Report and Written Opinion, International Application No. PCT/US2011/028516, 15 pgs., Dec. 28, 2011.

* cited by examiner

*Primary Examiner* — Gregory J Toatley
*Assistant Examiner* — Terence Stifter, Jr.
(74) *Attorney, Agent, or Firm* — Benjamin Fite; Baker Botts L.L.P.

(57) ABSTRACT

A method of processing acoustic waveform data is disclosed. An acoustic logging tool acquires acoustic waveform data. An adaptive frequency filter is determined. The acoustic waveform data is filtered using the adaptive frequency filter. A formation slowness is determined from the filtered acoustic waveform data. The lower bound of the adaptive frequency filter may be determined using a polynomial function of a minimum excitement frequency parameter, a slowness parameter, and a third parameter. The upper bound of the adaptive frequency filter may be determined using a polynomial function of a peak excitement frequency parameter, the slowness parameter, and the third parameter.

10 Claims, 13 Drawing Sheets

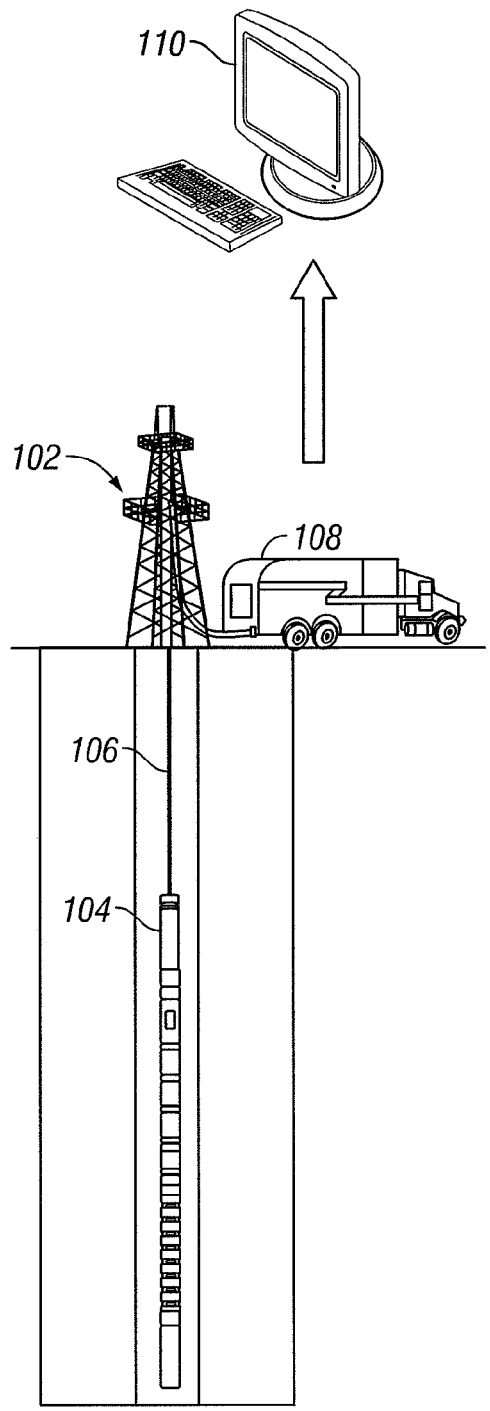
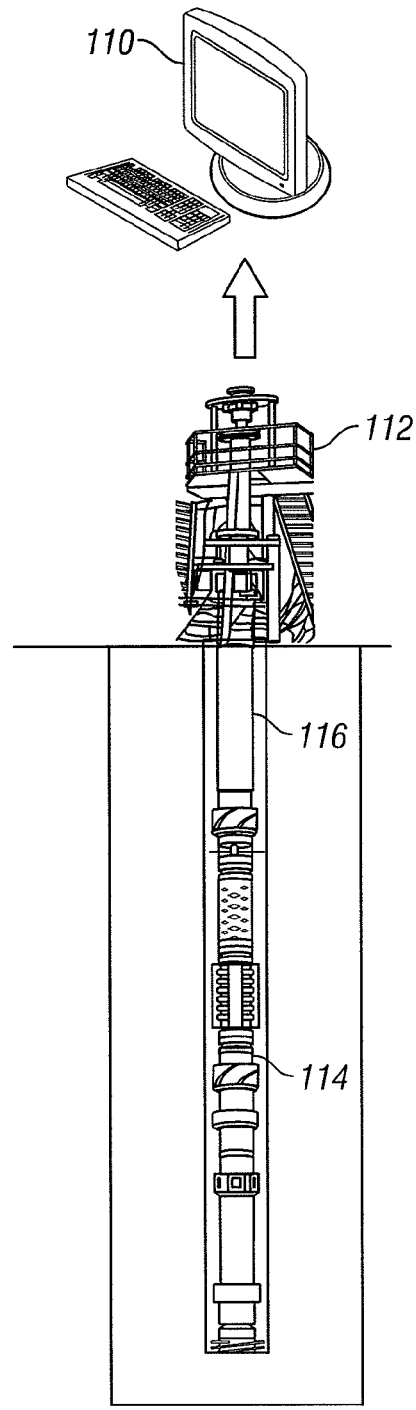
FIG. 1A                    FIG. 1B

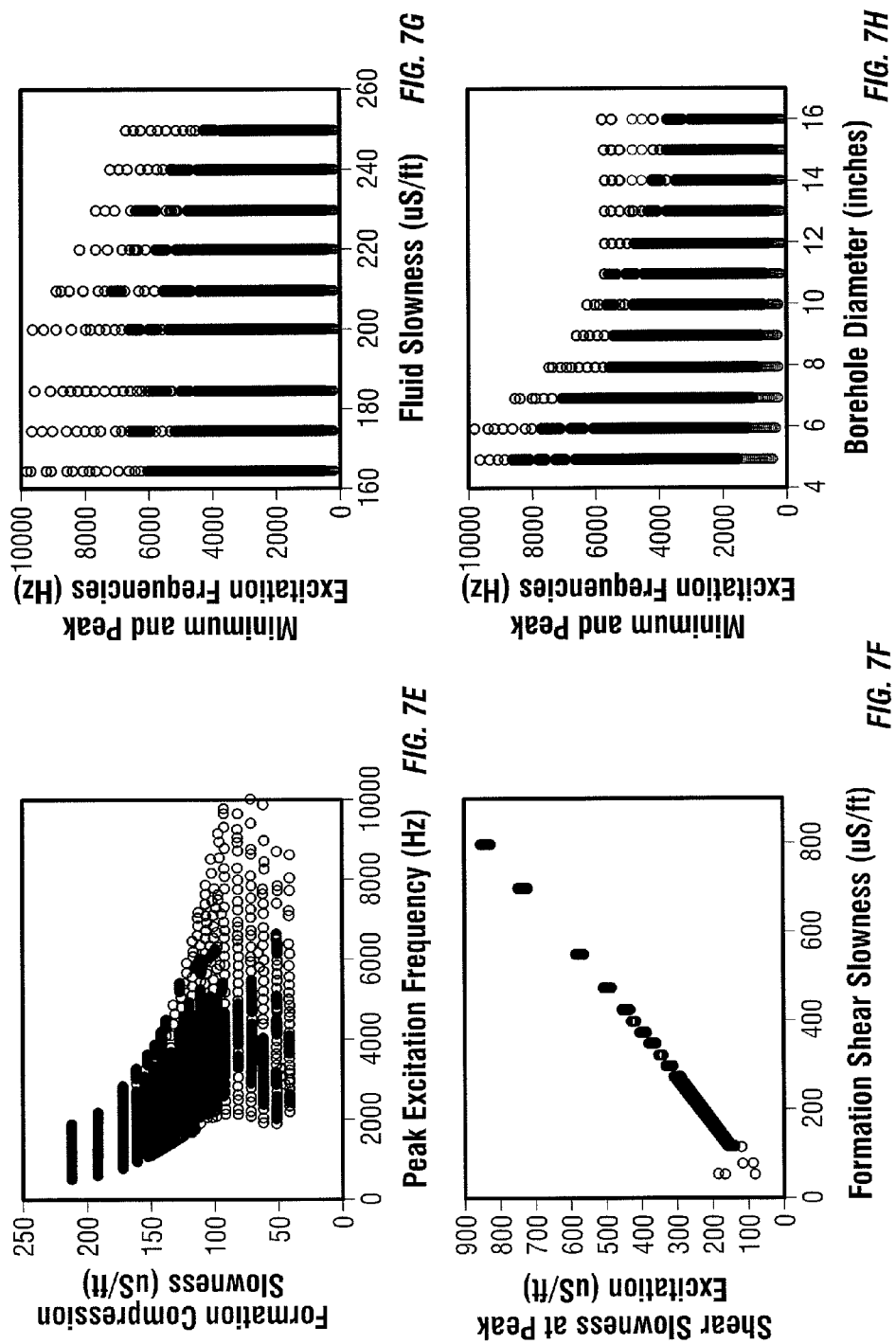

ACOUSTIC SIGNAL PROCESSING USING MODEL-BASED ADAPTIVE FILTERING

CROSS-REFERENCE TO RELATED APPLICATIONS

This application is a U.S. National Stage Application of International Application No. PCT/US2011/028516 filed Mar. 15, 2011, and which is hereby incorporated by reference in its entirety.

BACKGROUND

Acoustic waveform processing is frequently used to estimate properties of a geological formation. Acoustic waveform data may be collected using an acoustic logging tool. The acoustic logging tool typically includes an acoustic source (transmitter), and a set of receivers that are spaced several inches or feet apart. An acoustic signal is transmitted by the acoustic source, and received at the receivers of the tool, which are spaced apart from the acoustic source. Measurements are repeated every few inches as the tool is drawn up (or down) the borehole. The acoustic signal from the acoustic source travels through the formation adjacent to the borehole to the receiver array. The arrival times and perhaps other characteristics of the received signals are recorded. Typically, compressional wave (P-wave), shear wave (S-wave), and Stoneley wave arrivals are observed by the receivers and are processed into an acoustic waveform data format. The acoustic waveform data can be processed to determine other formation characteristics such as formation slowness (which is the inverse of acoustic speed), from which pore pressure, porosity, and other formation properties can be determined.

Many different techniques are known in the art for processing the acoustic waveform data in order to obtain information regarding the borehole, the formation, or both. Typically, the processing involves digitizing the received signal at a desired sampling rate and then processing the digitized samples according to desired techniques.

BRIEF DESCRIPTION OF THE DRAWINGS

FIG. 1A illustrates acquiring acoustic waveform data in a wireline environment.

FIG. 1B illustrates acquiring acoustic waveform data in a logging while drilling environment.

FIGS. 7A-7H illustrate results from analyzing nearly 2,376 different models with variation of borehole size, borehole fluid properties, and all possible earth formations.

Figure 2A:
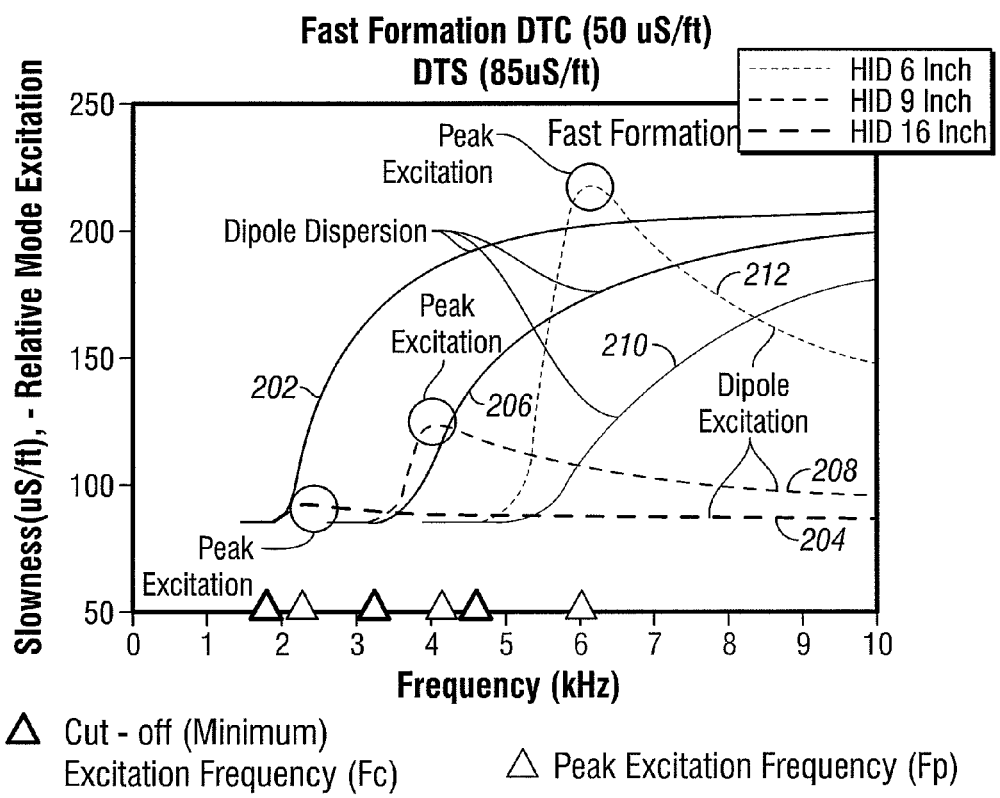
FIGS. 2A-2C illustrate dispersion slowness behavior and the corresponding formation excitation from a dipole source.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Turning now to FIG. 1A, an illustrative wireline environment is shown. A drilling platform supports a derrick 102 having a traveling block for raising and lowering an acoustic logging tool 104. The acoustic logging tool 104 has one or more acoustic sources ("transmitters") that are spaced apart from one or more receivers. The acoustic logging tool 104 is connected by a wire 106 to a computer processing system positioned above ground in a mobile unit 108. The computer processing system is capable of sending commands to the acoustic logging tool 104, and receiving data from the acoustic logging tool 104. In one embodiment, acoustic waveform data received from the acoustic logging tool 104 is processed in real-time by the computer processing system. In another embodiment, the acoustic waveform data received from the acoustic logging tool 104 is received by the computer processing system and stored for further processing at a remote computing center 110.

In FIG. 1B, an illustrative logging while drilling ("LWD") environment is shown. A drilling platform supports a derrick 112 having a traveling block for raising and lowering an acoustic logging tool 114 that is on a drill string 116. The acoustic logging tool 114 has one or more acoustic sources ("transmitters") that are spaced apart from one or more receivers. The acoustic logging tool 114 has a computer processing system connected to the transmitters and receivers. In one embodiment, the computer processing system is capable of performing real-time processing of acoustic waveform data acquired by the receivers. In another embodiment, the computer processing system stores the acoustic waveform data in a memory for later retrieval and processing at a remote computing center 110. The computer processing system may be capable of sending and receiving data to a computer processing system at the surface or a remote computing center 110 using mud pulses, or other data transmission techniques. Data may also be retrieved from the acoustic logging tool 114 when it is brought to the surface. The data may be transmitted to a remote computing center 110 for further processing.

The manner by which an acoustic wave propagates along a borehole depends upon the type of source excitation generated by the acoustic source. For example, an explosive acoustic source at the center of the borehole produces a wave that propagates in a monopole or hoop mode. A dipole acoustical source produces a wave that propagates in a flexural mode along the borehole. A quadrupole acoustic source produces a wave that propagates in a screw mode along the borehole. Each mode exhibits different characteristics that must be considered when using acoustic waveform data to calculate formation properties, particularly when the formation velocities are slower than the borehole fluid. Furthermore, all of the excitation modes are dispersive, which must be considered in order to calculate formation properties accurately.

Slowness-Time Coherence (STC) processing can be used to separate compressional, shear, flexural, and Stoneley wave arrivals. In STC processing, the measured signal is time window "filtered" and stacked, and a semblance function is computed. The semblance function relates the presence or absence of an arrival with a particular assumed slowness and particular assumed arrival time. If the assumed slowness and arrival time do not coincide with that of the measured arrival, the semblance takes on a smaller value. Consequently, arrivals in the received waveforms manifest themselves as local peaks in a plot of semblance versus slowness and arrival time. However, the dispersive nature of the acoustic waves result in estimates of formation slowness that are far from the actual formation slowness.

Figure 2B:
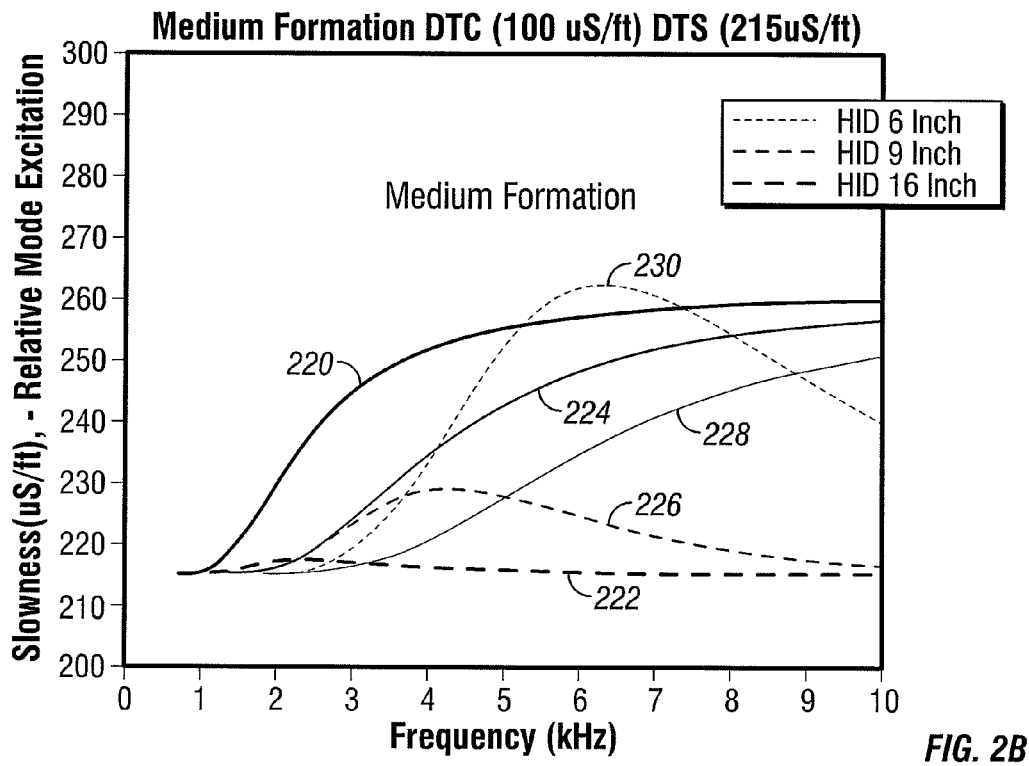
Figure 2C:
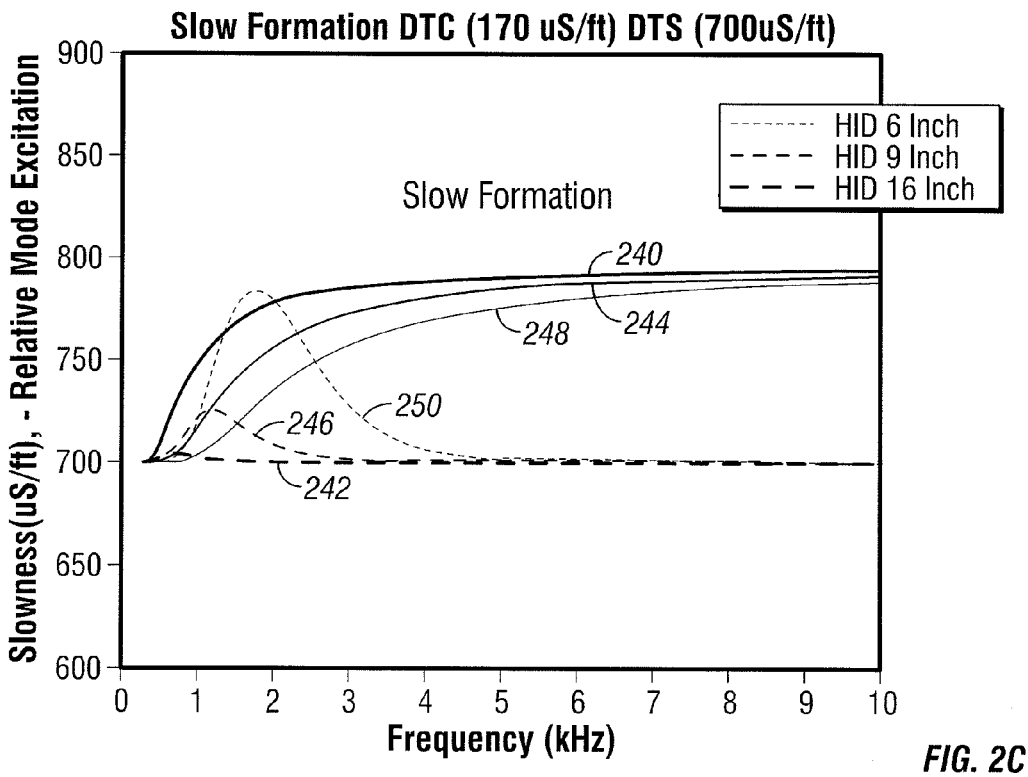

FIGS. 2A-2C illustrate dispersion slowness behavior and the corresponding formation excitation from a dipole source. FIG. 2A illustrates a model of a fast formation where the compression slowness (DTC) is 50 microseconds per foot, and the shear slowness (DTS) is 85 microseconds per foot. A formation is "fast" when the formation's shear velocity is greater than the acoustic velocity (which is the inverse of slowness) of the fluid in the borehole. Three boreholes were excited using an acoustic logging tool with a dipole acoustic source at various frequencies at constant power. The slowness at each frequency was then estimated using a theoretical modal analysis of these three boreholes with appropriate parameters. Lines 202, 206, and 210 show the estimated slowness for the 16-inch, 9-inch, and 6-inch boreholes respectively. The excitation energy of the formation at each frequency was also calculated from the same theoretical modal analysis. Lines 204, 208, and 212 display the relative energy levels detected in the formation from the 16-inch, 9-inch, and 6-inch boreholes respectively (energy scale not shown). From this data, the minimum excitation frequency and the peak excitation frequency are determined for each borehole. The minimum excitation frequency is the lowest frequency at which an excitation can be detected in the formation using an acoustic source at a given power. Typically, excitation in the formation can be detected at a lower frequency only if the power of the acoustic source is significantly increased. The peak excitation frequency is the frequency at which the most energy can be anticipated from the formation to the acoustic logging tool. For the 16-inch borehole, the minimum excitation frequency was observed at approximately 1.8 kHz, and the maximum excitation frequency was observed at approximately 2.2 kHz. For the 9-inch borehole, the minimum excitation frequency was observed at approximately 3 kHz, and the maximum excitation frequency was observed at approximately 4 kHz. For the 6-inch borehole, the minimum excitation frequency was observed at approximately 4.7 kHz, and the maximum excitation frequency was observed at approximately 6 kHz.

FIG. 2B illustrates a model of a medium formation where the compression slowness (DTC) is 100 microseconds per foot, and the shear slowness (DTS) is 215 microseconds per foot. Lines 220, 224, and 228 show the calculated formation slowness for the 16-inch, 9-inch, and 6-inch boreholes respectively. Lines 222, 226, and 230 display the relative excitation levels detected in the formation from the 16-inch, 9-inch, and 6-inch boreholes respectively (energy scale not shown). For the 16-inch borehole, the minimum excitation frequency was observed at approximately 1 kHz, and the maximum excitation frequency was observed at approximately 2 kHz. For the 9-inch borehole, the minimum excitation frequency was observed at approximately 1.5 kHz, and the maximum excitation frequency was observed at approximately 4 kHz. For the 6-inch borehole, the minimum excitation frequency was observed at approximately 2 kHz, and the maximum excitation frequency was observed at approximately 6.5 kHz.

FIG. 2C illustrates a model of a slow formation where the compression slowness (DTC) is 170 microseconds per foot, and the shear slowness (DTS) is 700 microseconds per foot. A formation is "slow" when the formation's shear velocity is lower than the acoustic velocity of the fluid in the borehole. Lines 240, 244, and 248 show the calculated slowness for the 16-inch, 9-inch, and 6-inch boreholes respectively. Lines 242, 246, and 250 display the relative excitation levels detected in the formation from the 16-inch, 9-inch, and 6-inch boreholes respectively (energy scale not shown). For the 16-inch borehole, the minimum excitation frequency was observed at approximately 0.4 kHz, and the maximum excitation frequency was observed at approximately 0.9 kHz. For the 9-inch borehole, the minimum excitation frequency was observed at approximately 0.5 kHz, and the maximum excitation frequency was observed at approximately 1.2 kHz. For the 6-inch borehole, the minimum excitation frequency was observed at approximately 0.7 kHz, and the maximum excitation frequency was observed at approximately 1.8 kHz.

Formation slowness calculations using slowness-time coherence methods are frequently performed at higher acoustic frequencies because the signal strength is greater. However, as the foregoing figures illustrate, these estimates can overstate the slowness of a formation. In practice, theoretical models have been used to correct for the dispersive slowness behavior exhibited at higher acoustic frequencies. Theoretical models require accurate information about the diameter of the borehole and properties of the borehole fluid, which may vary at different depths, as well as downhole tool properties and the calculated formation slowness.

The acoustic waveform processing method disclosed herein uses adaptive filtering based upon various models to more accurately estimate formation slowness. The foregoing figures illustrate two principles that are exploited by the method disclosed herein. First, when formation slowness is calculated at the minimum excitation frequency, it closely estimates the actual formation slowness. Second, when formation slowness is calculated at the peak excitation frequency or higher, the calculated formation slowness is significantly greater than the actual formation slowness.

Figure 3:
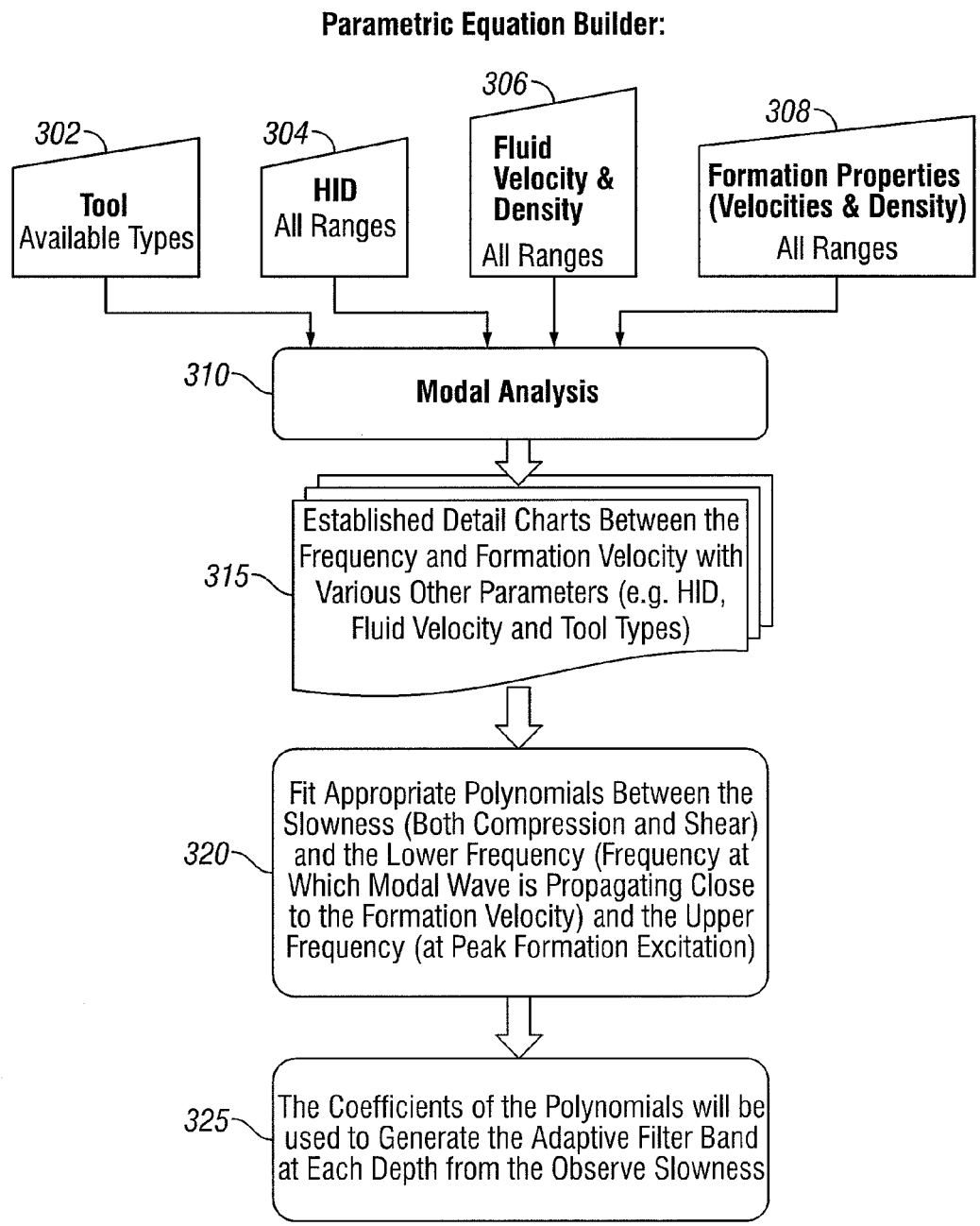
FIG. 3 is a chart illustrating the steps for determining the polynomial coefficients used for an adaptive filter.

Turning now to FIG. 3, a chart illustrating the steps for determining the polynomial coefficients used for an adaptive filter is shown. Data describing the types of downhole tools 302, borehole diameters 304, fluid properties (velocities, densities, or both) 306, and formation properties (velocities, densities, or both) 308 may be used as parameters for modal analysis 310. At step 315, two sets of data plots are created. In the first plot, the minimum excitation frequencies are plotted with the corresponding formation slowness (the inverse of the formation's acoustic velocity) and a third parameter. In the second plot, the peak excitation frequencies are plotted with the corresponding formation slowness and the third parameter. At step 320, fit appropriate polynomials are determined for each data plot. The polynomials may be fitted to the respective curves or surfaces using the method of least squares. The fit appropriate polynomial determined for the data plot using the minimum excitation frequencies is used to establish a lower bound of the adaptive filter. Similarly, the fit appropriate polynomial determined for the data plot using the peak excitation frequencies is used to establish an upper bound of the adaptive filter. At step 325, the coefficients of the polynomials are used to generate the adaptive filter band at each depth from the observed slowness.

Figure 4:
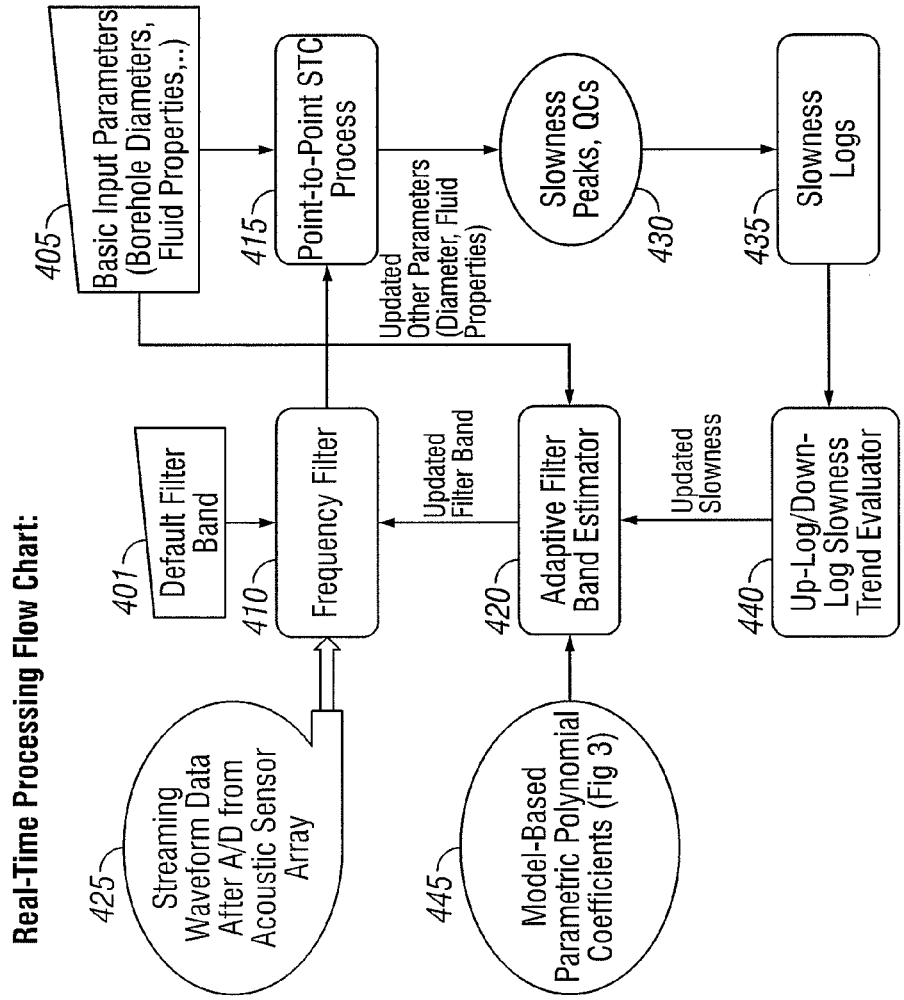
FIG. 4 is a chart illustrating the steps of a real-time processing embodiment of the acoustic waveform processing method disclosed herein.

Turning now to FIG. 4, a chart illustrating the steps of a real-time processing embodiment of the acoustic waveform processing method disclosed herein is shown. Before the real-time processing begins, a default filter band 401 and basic input parameters 405 are supplied. In a hard formation (fast formation), a default filter band of 1 kHz to 6 kHz may be used. In a medium formation, a default filter band of 750 Hz to 4 kHz may be used. In a soft formation (slow formation), a default filter band of 500 Hz to 2 kHz may be used. The basic input parameters 405 may include the slowness window of processing, tool types, borehole diameters, and fluid properties. The tool type parameter may indicate whether a wireline or logging-while-drilling tool is being used. Wireline tools have less of an effect on formation property measurements than logging-while-drilling tools because logging-while-drilling tools have a larger metal body presence in the borehole. The borehole diameters may be measured by a caliper tool. The fluid properties may be calculated (for example, the mud weight may be used to estimate the mud velocity), or may be measured by a sensor. The default filter band 401 is used to initialize the frequency filter 410. The basic input parameters 405 are used to initialize the point-to-point slowness-time coherence process 415 and the adaptive filter band estimator 420. Once initialized, streaming acoustic waveform data 425 acquired from an acoustic logging tool, such as the acoustic logging tool 104 shown in FIG. 1A or the acoustic logging tool 114 shown in FIG. 1B, is fed into the frequency filter 410. If a data point from the streaming acoustic waveform data 425 is above the lower bound frequency of the current adaptive frequency filter in use by the frequency filter 410 and below the upper bound of the current adaptive frequency filter in use by the frequency filter 410, then the data point is fed into the point-to-point slowness-time coherence process 415. The slowness-time coherence process 415 calculates the slowness from the data point. At 430, slowness peaks may be noted, and other measures to ensure quality control may be calculated. For example, in the slowness-time coherence process 415 a semblance function is calculated. The semblance value ranges from 0, indicating no correlation, to 1, indicating perfect correlation. The semblance value may be used to determine whether to ignore a particular data point or not. For example, if the semblance value for a particular data point is below a certain threshold, such as 0.25, then that particular data point may not be used by the up-log/down-log slowness trend evaluator 440 because the data point is considered an outlier from the slowness trend. The resulting calculations may then be logged in the slowness logs 435. The estimated slowness is fed into the up-log/down-log slowness trend evaluator 440, which tracks whether the estimated slowness of the formation is trending up or trending down. The detected trend is then provided to the adaptive filter band estimator 420. The adaptive filter band estimator uses the supplied basic input parameters 405, polynomial coefficients 445 calculated from the modal analysis, and the estimated formation slowness trends from the up-log/down-log slowness trend evaluator 440 to adjust the frequency filter that is to be applied to the next set of data points received from the streaming acoustic waveform data 425.

Figure 5:
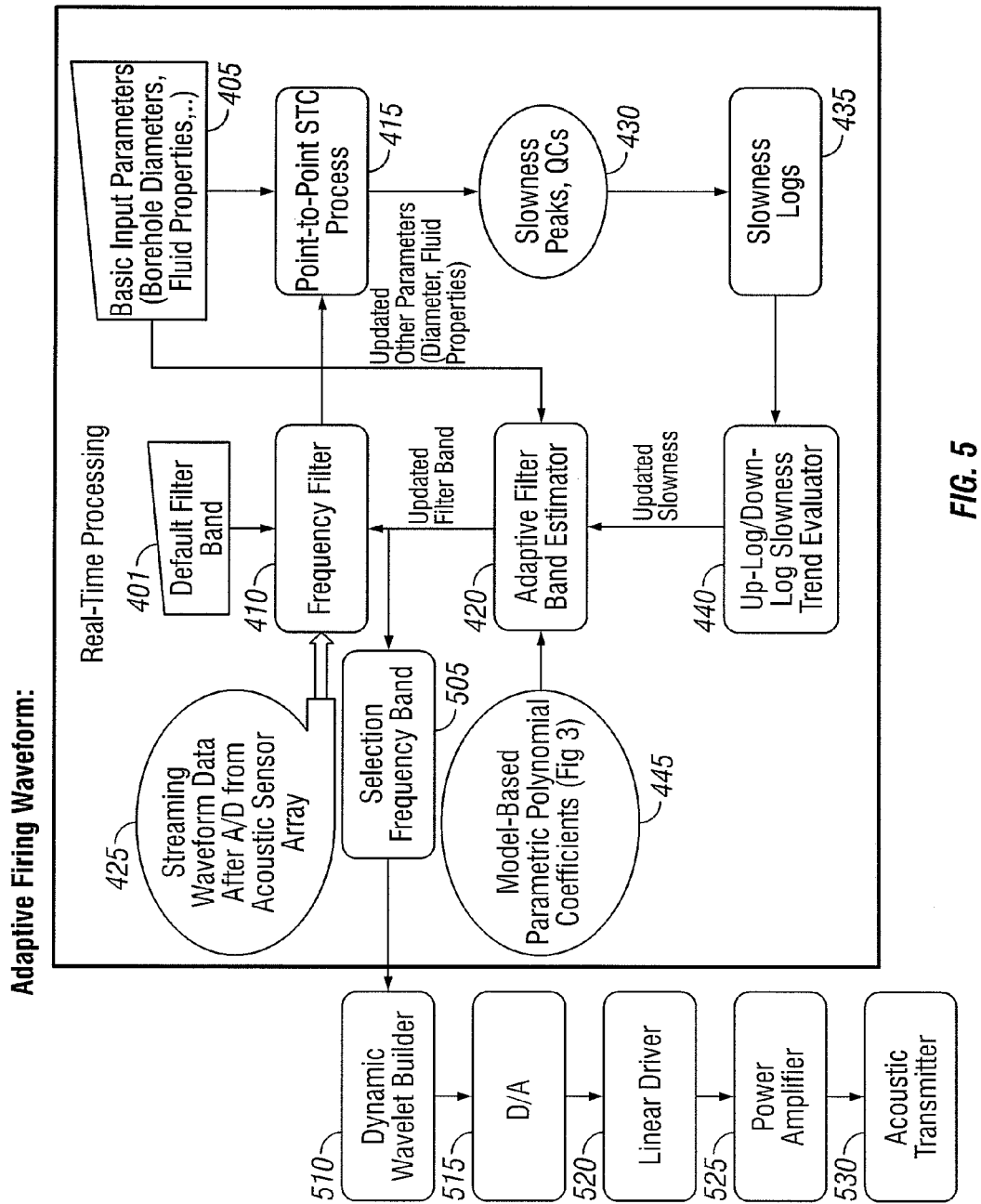
FIG. 5 is a chart illustrating the steps of a real-time processing embodiment with adaptive waveform firing of the acoustic waveform signal processing method disclosed herein.

Turning now to FIG. 5, a chart illustrating the steps of a real-time processing embodiment with adaptive waveform firing of the acoustic waveform signal processing method disclosed herein is shown. Before the real-time processing begins, a default filter band 401 and basic input parameters 405 are supplied. The default filter band 401 is used to initialize the frequency filter 410. The basic input parameters 405 are used to initialize the point-to-point slowness-time coherence process 415 and the adaptive filter band estimator 420. Once initialized, streaming acoustic waveform data 425 acquired from an acoustic logging tool, such as the acoustic logging tool 104 shown in FIG. 1A or the acoustic logging tool 114 shown in FIG. 1B, is fed into the frequency filter 410. If a data point from the streaming acoustic waveform data 425 is above the lower bound of the current adaptive frequency filter in use by the frequency filter 410 and below the upper bound of the current adaptive frequency filter in use by the frequency filter 410, then the data point is fed into the point-to-point slowness-time coherence process 415. The slowness-time coherence process 415 calculates the slowness from the data point. At 430, slowness peaks may be noted, and other calculations, such as the semblance value, to ensure quality control may be calculated. The resulting calculations may then be logged in the slowness logs 435. The estimated slowness is fed into the up-log/down-log slowness trend evaluator 440, which tracks whether the estimated slowness of the formation is trending up or trending down. The detected trend is then provided to the adaptive filter band estimator 420. The adaptive filter band estimator uses the supplied basic input parameters 405, polynomial coefficients 445 calculated from the modal analysis, and the estimated formation slowness trends from the up-log/down-log slowness trend evaluator 440 to adjust the frequency filter that is to be applied to the next set of data points received from the streaming acoustic waveform data 425. The updated filter band from the adaptive filter band estimator 420 is provided to a selection frequency band module 505. The selection frequency band module 505 uses the updated filter band to select the frequencies at which the acoustic source will excite the formation. The selected frequency band is sent to the dynamic wavelet builder 510 that creates a digital wavelet containing the selected frequency band 505 and appropriate amplitude to excite the formation. The digital-to-analog converter (D/A) 515 transforms the digital wavelet received from the dynamic wavelet builder 510 into an analog signal for input into the linear driver 520. The linear driver 520 is a preamplifier used to amplify the wavelet so that there will be no distortion of the signal when it is used as the input to the power amplifier 525. The power amplifier 525 amplifies the received wavelet so that it can drive the acoustic transmitter 530. The acoustic transmitter 530 is used to excite the formation. For dipole mode generation, the acoustic transmitter 530 may be a PZT bender bar.

Figure 6:
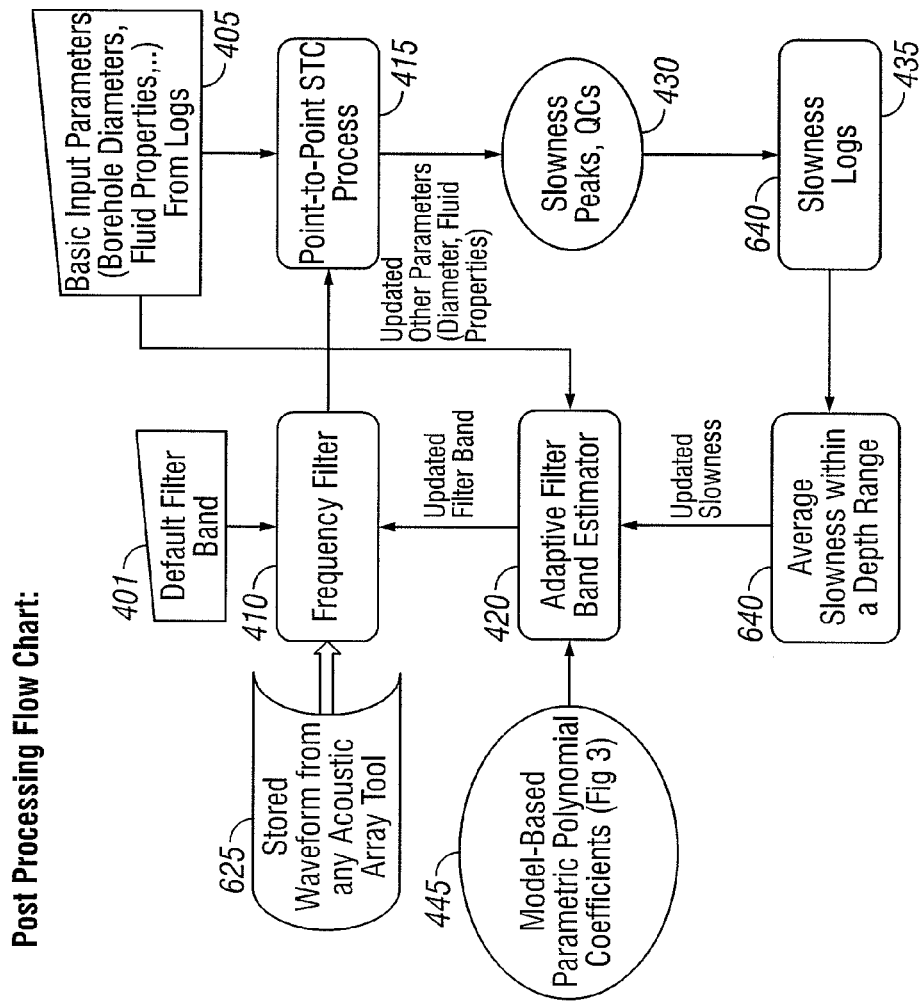
FIG. 6 is a chart illustrating the processing steps of a post-processing embodiment of the acoustic waveform processing method disclosed herein.

Turning now to FIG. 6, a chart illustrating the processing steps of a post-processing embodiment of the acoustic waveform processing method disclosed herein is shown. In this embodiment, all of the acoustic waveform data and logs are retrieved from an acoustic logging tool, such as the acoustic logging tool 114 shown in FIG. 1B, or may be retrieved from a computer processing system 108 which may have acquired the data live from the acoustic logging tool 104 shown in FIG. 1A. Before post-processing can begin, a default filter band 401 and basic input parameters 405 are supplied. In this embodiment, the basic input parameters 405 may be retrieved from logs. The default filter band 401 is used to initialize the frequency filter 410. The basic input parameters 405 are used to initialize the point-to-point slowness-time coherence process 415 and the adaptive filter band estimator 420. Once started, stored acoustic waveform data 625 is fed into the frequency filter 410. If a data point from the stored acoustic waveform data 625 is above the lower bound of the current adaptive frequency filter in use by the frequency filter 410 and below the upper bound of the current adaptive frequency filter in use by the frequency filter 410, then the data point is fed into the point-to-point slowness-time coherence process 415. The slowness-time coherence process 415 calculates the slowness from the data point. At 430, slowness peaks may be noted, and other measures to ensure quality control, such as the semblance value, may be calculated. The resulting calculations may then be logged in slowness logs 435. The estimated slowness is fed into a module that tracks the average slowness within a depth range 640. The updated average slowness for the current depth range is then provided to the adaptive filter band estimator 420. The adaptive filter band estimator uses the supplied basic input parameters 405, polynomial coefficients 445 calculated from the modal analysis, and the average slowness within the current depth range, supplied from module 640, to adjust the frequency filter that is to be applied to the next set of data points received from the stored acoustic waveform data 625.

Figure 7A:
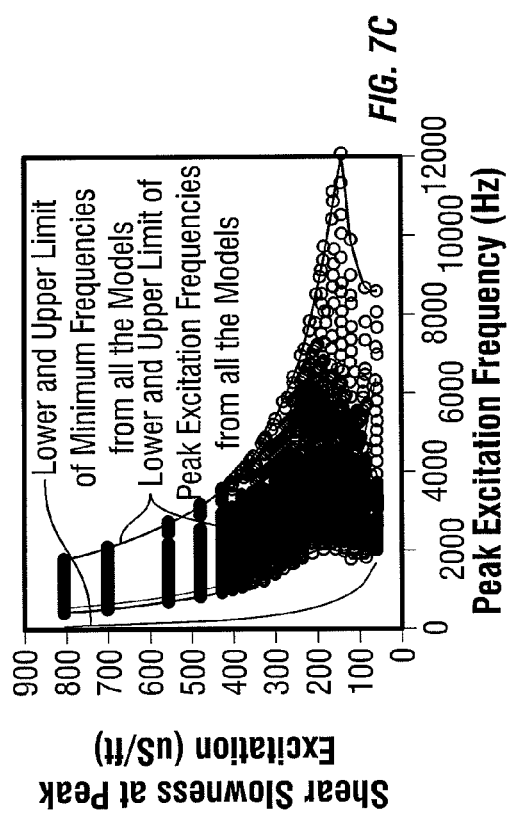
Figure 7B:
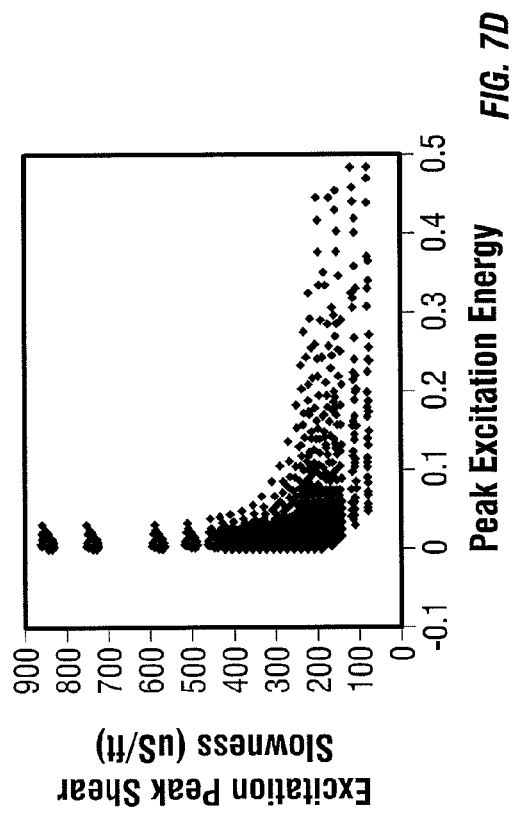
Figure 7C:
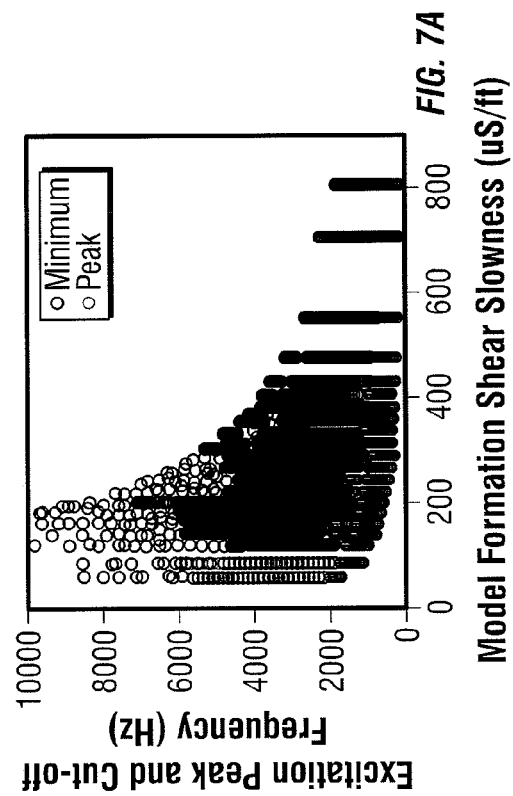
Figure 7D:
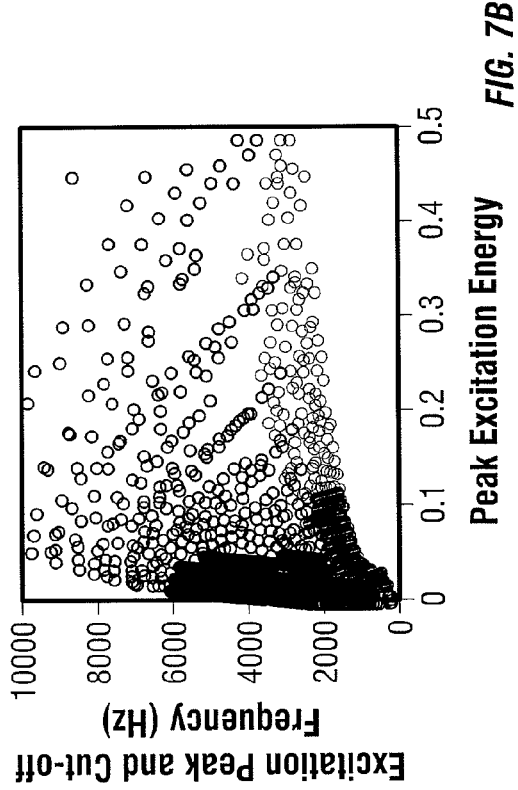
Figure 8A:
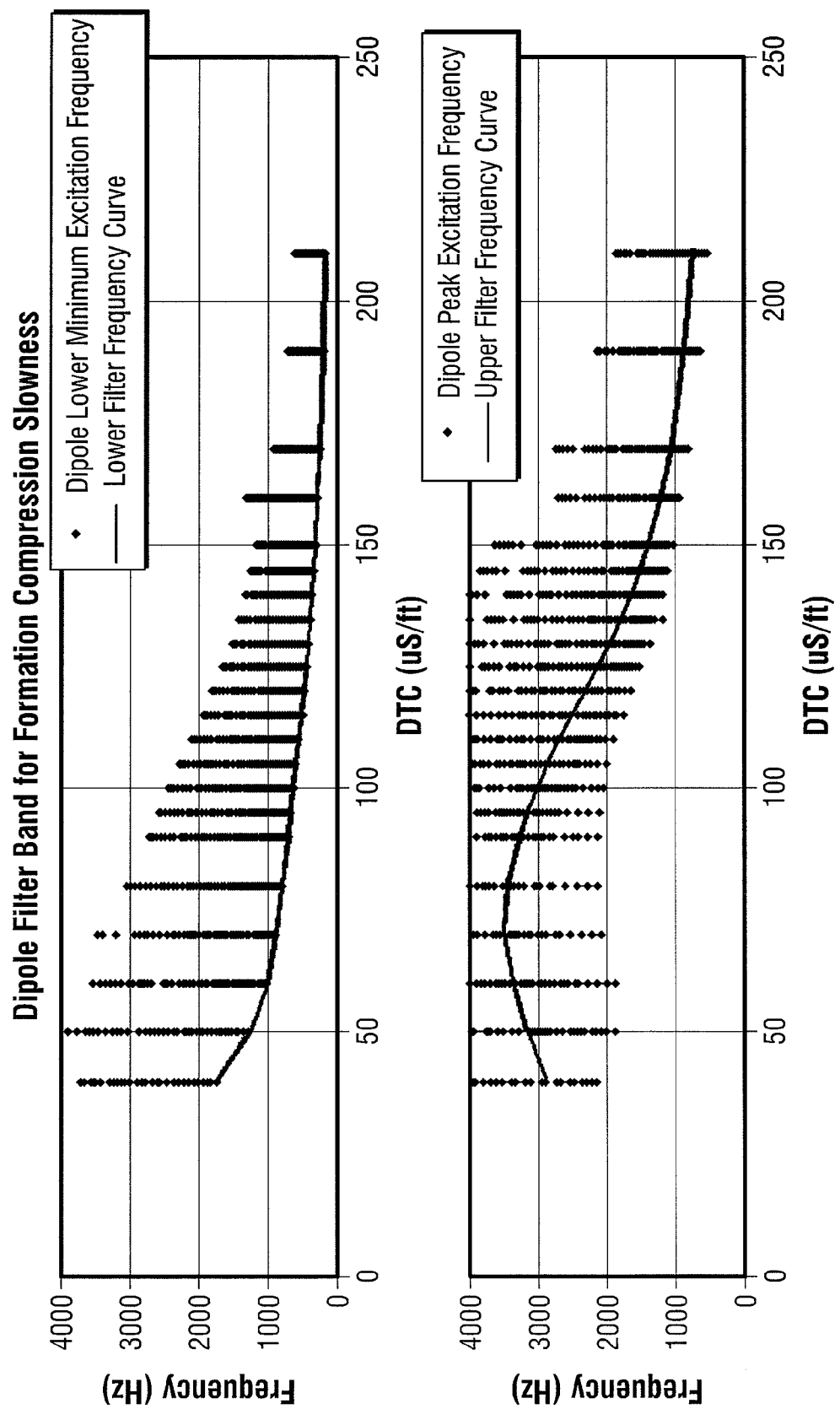
FIG. 8A illustrates the polynomials fitting the minimum excitation and peak excitation frequencies of various models of formation compressional slowness.
Figure 9A:
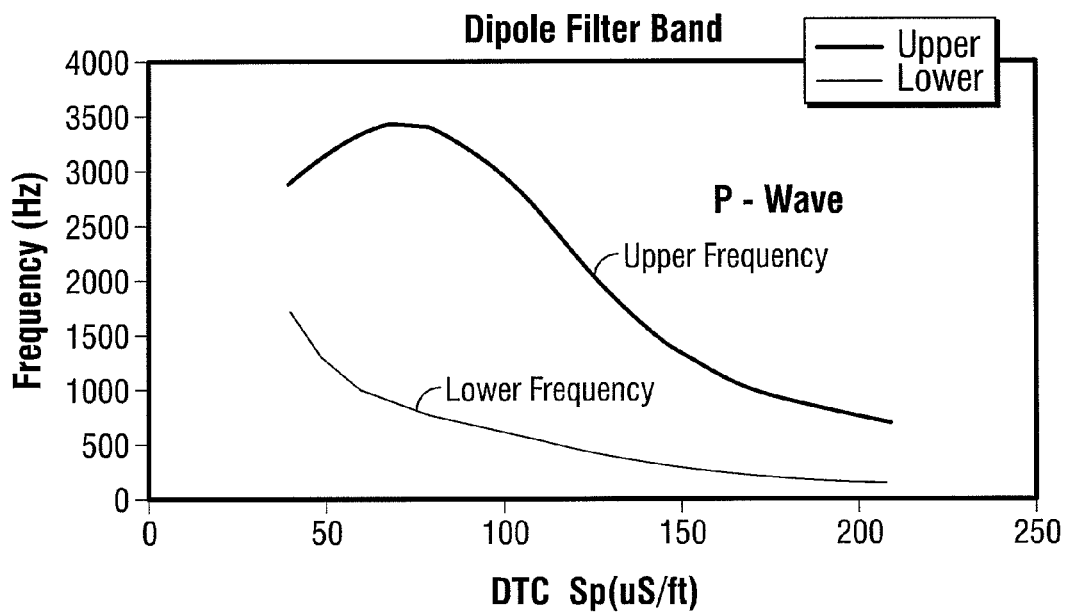
FIG. 9A is a graph of the lower bound and the upper bound of an adaptive frequency filter for the compressional slowness.

FIGS. 7A-7H illustrate results from analyzing nearly 2,376 different models. The sample data included data acquired from boreholes with diameters ranging from five to sixteen inches, borehole fluid slowness ranging from 165 to 250 microseconds per foot, compressional slowness ranging from 40 to 210 microseconds per feet, and shear slowness ranging from 60 to 800 microseconds per foot. For each model, the dipole excitation and dispersion characteristics at various frequencies were analyzed. FIG. 7A is a data plot of the minimum excitation frequencies and peak excitation frequencies observed in formations of varying slowness. FIG. 7B is a data plot of the minimum excitation frequencies and peak excitation frequencies with the observed relative excitation energies. FIG. 7C is a data plot showing the lower and upper limits of the observed minimum excitation frequencies, and the lower and upper limits of the observed peak excitation frequencies. FIG. 7D is a data plot showing the observed shear slowness at the peak excitation energy levels. FIG. 7E is a data plot showing the calculated formation compression slowness at the peak excitation frequencies. FIG. 7F is a data plot showing the calculated formation shear slowness at peak excitation and the formation shear slowness. FIG. 7G is a data plot showing the minimum and peak excitation frequencies and the observed fluid slowness. FIG. 7H is a data plot showing the minimum and peak excitation frequencies and the observed borehole diameter FIG. 8A illustrates the polynomials fitting the minimum excitation and peak excitation frequencies of various models of formation compressional slowness. The fitting polynomial for the lower bound of the adaptive frequency filter is based on the lowest minimum excitation frequencies from the model. The fitted polynomials were found using the least squares method. The lower bound for the formation compressional slowness is estimated by: $y=p_1 x^4+p_2 x^3+p_3 x^2+p_4 x+p_5$, where $p_1=-9.413\times10^{-6}$, $p_2=-0.0051947$, $p_3=1.0618$, $p_4=-100.61$, and $p_5=4287.2$. The upper bound for the formation compressional slowness is estimated by: $y=p_1 x^4+p_2 x^3+p_3 x^2+p_4 x+p_5$, where $p_1=-1.6172\times10^{-5}$, $p_2=0.019048$, $p_3=-2.5203$, $p_4=210.56$, and $p_5=-2278.1$. FIG. 9A is a graph of the lower bound and the upper bound of an adaptive frequency filter for the compressional slowness.

Figure 8B:
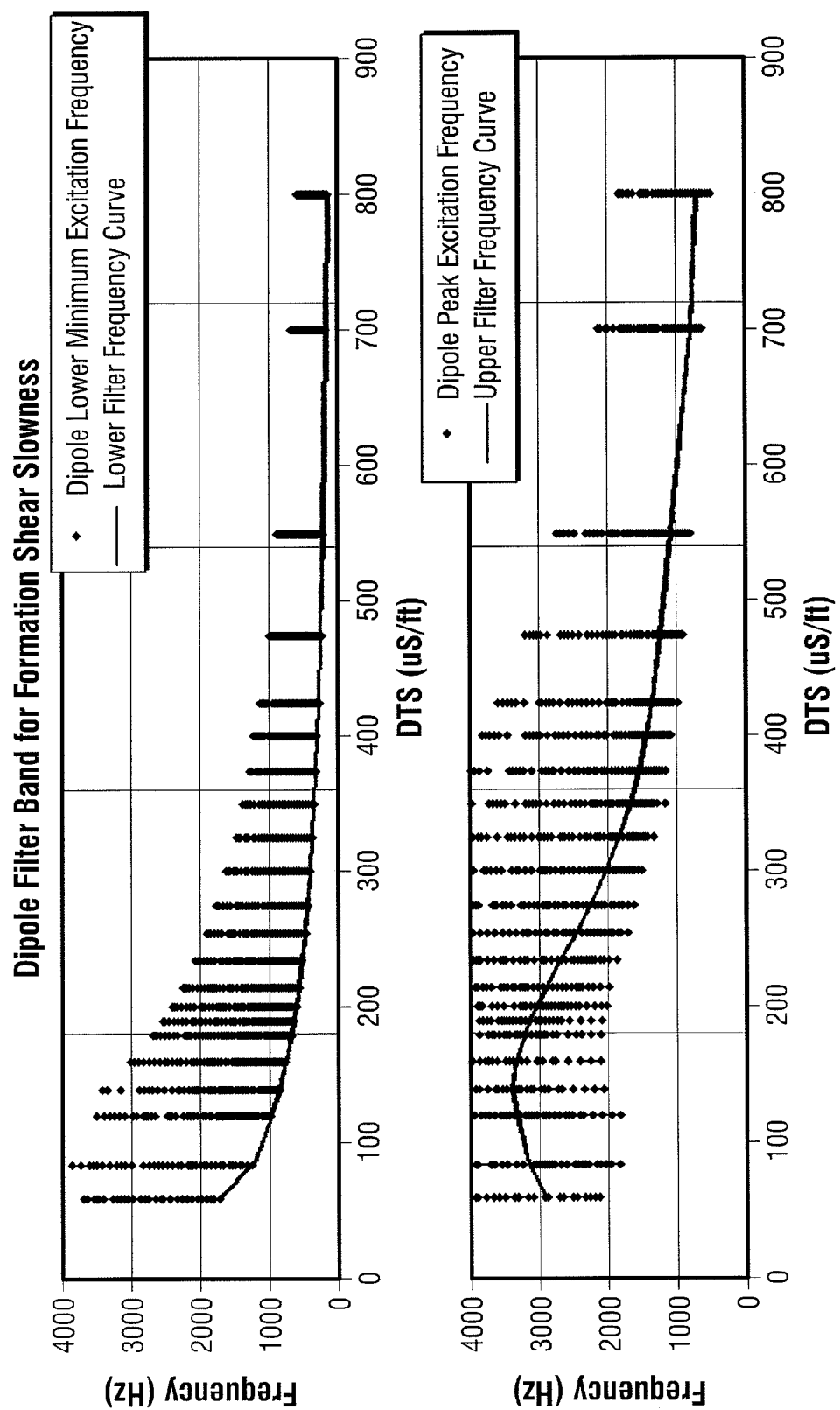
FIG. 8B illustrates the polynomials fitting the minimum excitation and peak excitation frequencies of various models of formation shear slowness.
Figure 9B:
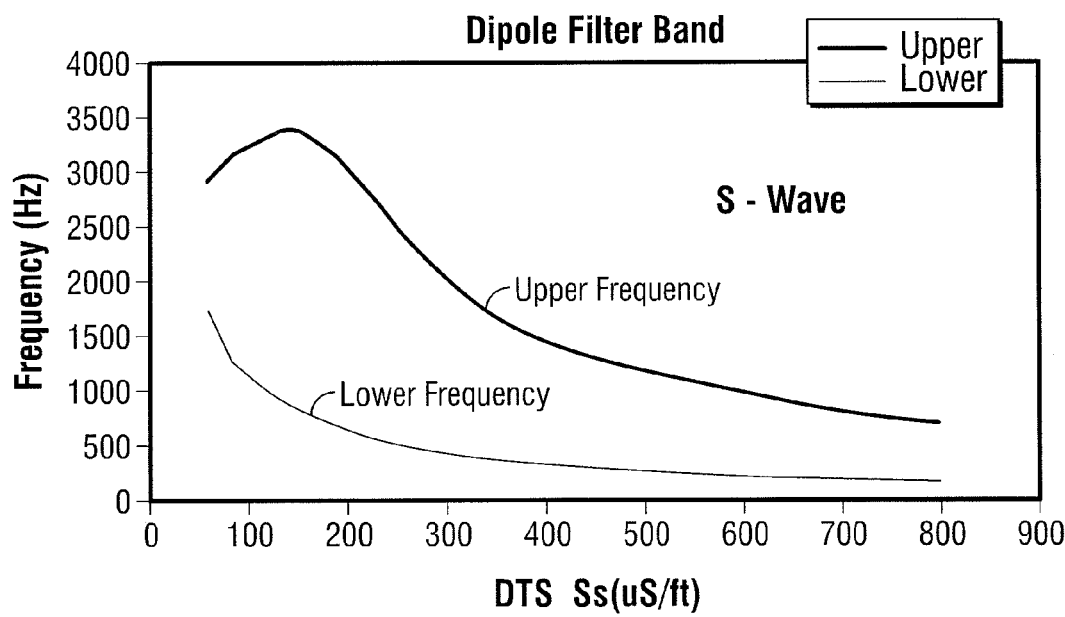
FIG. 9B is a graph of the lower bound and the upper bound of an adaptive frequency filter for the shear slowness.

FIG. 8B illustrates the polynomials fitting the minimum excitation and peak excitation frequencies of various models of formation shear slowness. The fitting polynomial for the lower bound is based on the lowest minimum excitation frequencies from the model. The fitted polynomials were found using the least squares method. The lower bound for the formation shear slowness is estimated by: $y=p_1 x^4+p_2 x^3+p_3 x^2+p_4 x+p_5$, where $p_1=3.5494\times10^{-8}$, $p_2=-7.2034\times10^{-5}$, $p_3=0.052828$, $p_4=-17.2$, and $p_5=2469.8$. The upper bound for compressional slowness is estimated by: $y=p_1 x^6+p_2 x^5+p_3 x^4+p_4 x^3+p_5 x^2+p_6 x+p_7$, where $p_1=9.7297\times10^{-14}$, $p_2=1.2642\times10^{-10}$, $p_3=-6.659\times10^{-7}$, $p_4=0.00070505$, $p_5=-0.30253$, $p_6=47.78$, and $p_7=930.43$. FIG. 9B is a graph of the lower bound and the upper bound of an adaptive frequency filter for the shear slowness.

Figure 10A:
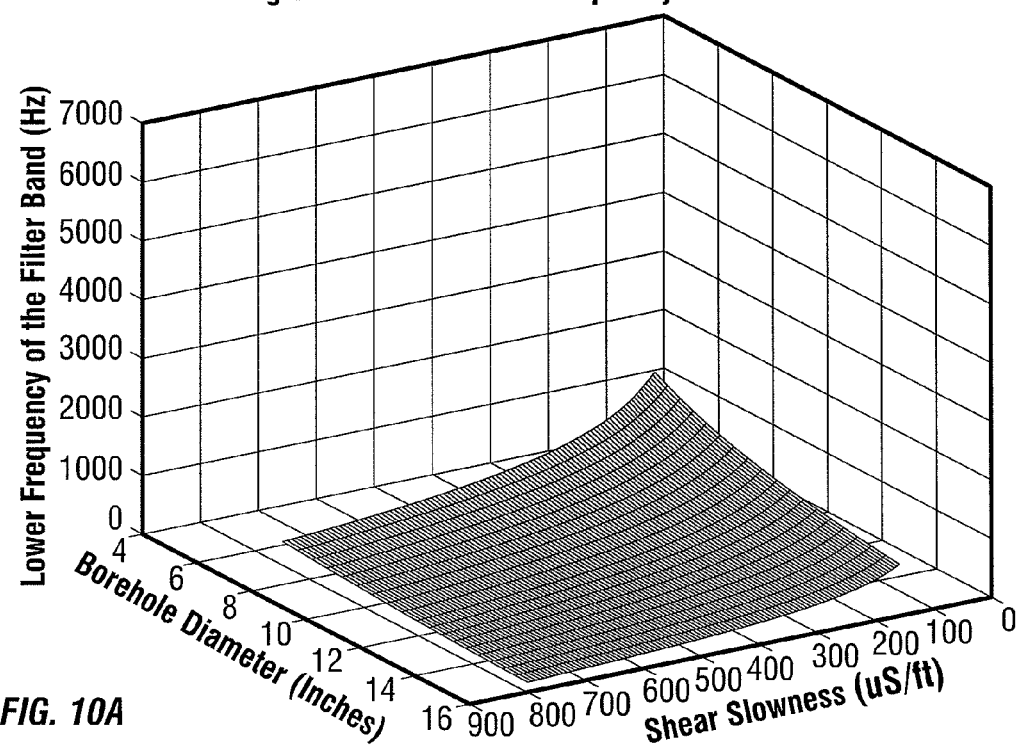
FIG. 10A illustrates a fitting surface for the lower bound of an adaptive frequency filter.
Figure 10B:
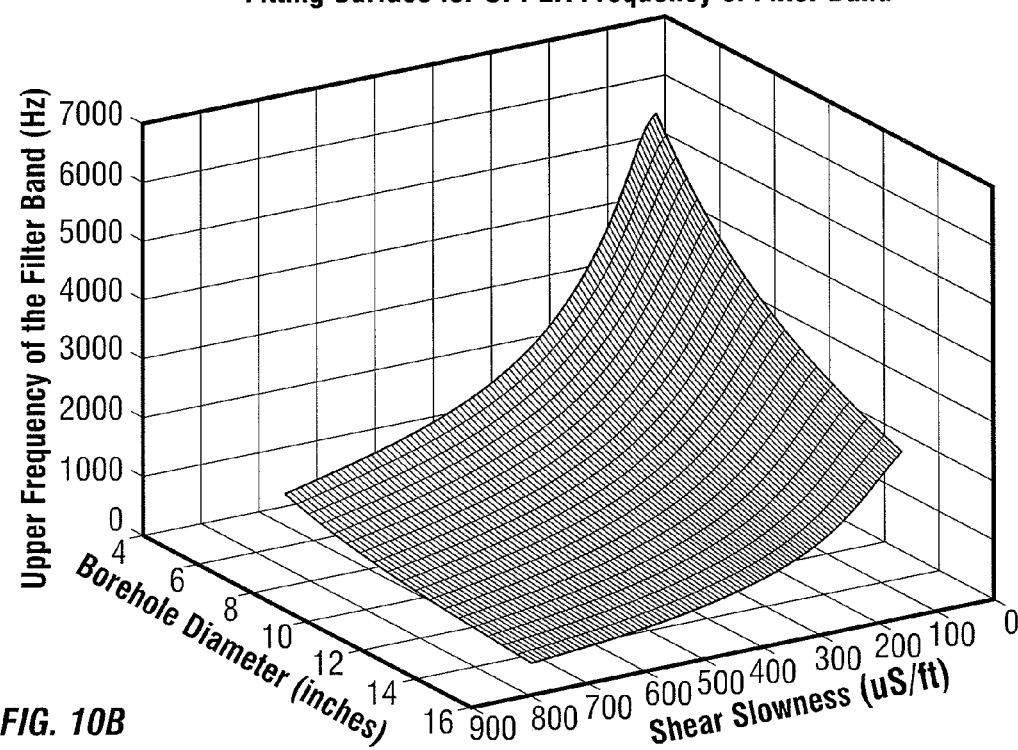
FIG. 10B illustrates a fitting surface for the upper bound of an adaptive frequency filter.

FIG. 10A illustrates a fitting surface for the lower bound of an adaptive frequency filter. The minimum excitation frequencies are plotted with the corresponding formation shear slowness and the borehole diameter. FIG. 10B illustrates a fitting surface for the upper bound of an adaptive frequency filter. The peak excitation frequencies are plotted with the corresponding formation shear slowness and the borehole diameter. A polynomial function can be found that fits each surface, and the resulting functions can be used for an adaptive frequency filter.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of processing acoustic waveform data comprising:
   acquiring acoustic waveform data from an acoustic logging tool;
   determining an adaptive frequency filter, wherein determining the adaptive frequency filter comprises
      determining a lower bound of the adaptive frequency filter using a first polynomial function of a minimum excitement frequency parameter, a slowness parameter, and a third parameter; and
      determining an upper bound of the adaptive frequency filter using a second polynomial function of a peak excitement frequency parameter, the slowness parameter, and the third parameter;
   filtering the acoustic waveform data using the adaptive frequency filter;
   determining a formation slowness from the filtered acoustic waveform data;
   selecting a frequency band for exciting a formation based in part upon the adaptive frequency filter;
   exciting the formation using a wavelet within the selected frequency band by an acoustic source of the acoustic logging tool; and
   determining an increasing or decreasing trend in the formation slowness; and
   updating the adaptive frequency filter based in part upon the increasing or decreasing trend.

2. The method of claim 1, wherein the first polynomial function and the second polynomial function are determined using the method of least squares.

3. The method of claim 1, wherein the slowness parameter comprises a formation shear slowness.

4. The method of claim 3, wherein the third parameter is selected from the group consisting of a tool type parameter, a borehole diameter parameter, a formation parameter, and a fluid property parameter.

5. The method of claim 1, wherein the slowness parameter comprises a formation compression slowness.

6. The method of claim 5, wherein the third parameter is selected from at least one of a tool type parameter, a borehole diameter parameter, a formation property parameter, and a fluid property parameter.

7. A method of processing acoustic waveform data comprising:
acquiring from a log file acoustic waveform data generated by an acoustic logging tool;
determining an adaptive frequency filter, wherein determining the adaptive frequency filter comprises
determining a lower bound of the adaptive frequency filter using a first polynomial function of a minimum excitement frequency parameter, a slowness parameter, and a third parameter; and
determining an upper bound of the adaptive frequency filter using a second polynomial function of a peak excitement frequency parameter, the slowness parameter, and the third parameter;
selecting a frequency band for exciting a formation based in part upon the adaptive frequency filter;
exciting the formation using a wavelet within the selected frequency band by an acoustic source of the acoustic logging tool;
filtering the acoustic waveform data using the adaptive frequency filter;
determining a formation slowness from the filtered acoustic waveform data;
calculating an average formation slowness; and
updating the adaptive frequency filter based in part upon the average formation slowness.

8. The method of claim 7, wherein the first polynomial function and the second polynomial function are determined using the method of least squares.

9. The method of claim 7, wherein the slowness parameter comprises a formation shear slowness.

10. The method of claim 7, wherein the slowness parameter comprises a formation compression slowness.

* * * * *